Jan. 2, 1940.　　　M. LEUPOLD　　　2,185,261
BRAKE
Filed March 18, 1938　　　3 Sheets-Sheet 2

INVENTOR,
MATHIAS LEUPOLD
BY Jerome R. Cox
ATTORNEY.

Jan. 2, 1940.　　　　M. LEUPOLD　　　　2,185,261
BRAKE
Filed March 18, 1938　　　3 Sheets-Sheet 3

INVENTOR.
MATHIAS LEUPOLD
BY Jerome R. Cox.
ATTORNEY.

Patented Jan. 2, 1940

2,185,261

UNITED STATES PATENT OFFICE 2,185,261

BRAKE

Mathias Leupold, Jamaica, N. Y., assignor to Bendix Products Corporation, South Bend, Ind., a corporation of Indiana Application March 18, 1938, Serial No. 196,590

17 Claims. (Cl. 188—3)

This invention relates to brakes and more particularly to brakes for towed vehicles or trailers.

I have found that, in the operation of tractor-trailer combinations now in such general use for motor transport, there is an ever present danger of "jack-knifing" in which the tractor and trailer swing together about the connecting hitch like the folding of a jack-knife blade into its handle.

"Jack-knifing" generally occurs at the times when the trailer tends to overrun the tractor as, for example, when the throttle of the tractor motor is closed, whereby the motor tends to retard the tractor by its compression, or when the tractor brakes are applied before the trailer brakes, or when the tractor brakes are applied to a greater degree than the trailer brakes in proportion to the load carried by each.

Therefore, one of the objects of this invention is to provide braking means to automatically prevent jack-knifing in tractor-trailer combinations.

Another object is to provide braking means on a trailer which serves to counteract any tendency of the trailer to overrun the tractor which is towing it.

I prefer to accomplish these objects by providing braking means which automatically applies the brakes of the trailer to a predetermined extent prior to, or at least simultaneously with, any retardation of the tractor. This braking means may preferably take the form of a small auxiliary fluid pressure power cylinder connected to operate the trailer brakes and provided with a valve adapted to be operated whenever the accelerator pedal on the tractor is fully released.

A modified arrangement for accomplishing these objects comprises admitting a predetermined pressure to the main power cylinder usually provided to operate the trailer brakes by means operated automatically whenever the accelerator pedal of the tractor vehicle is fully released.

The above and other objects and desirable particular constructions and arrangements of parts will now fully appear upon reference to the following detailed description of two embodiments of my invention illustrated in the accompanying drawings, in which:

Figure 4 is a section on the line 4—4 of Figure 1;

Figure 1:
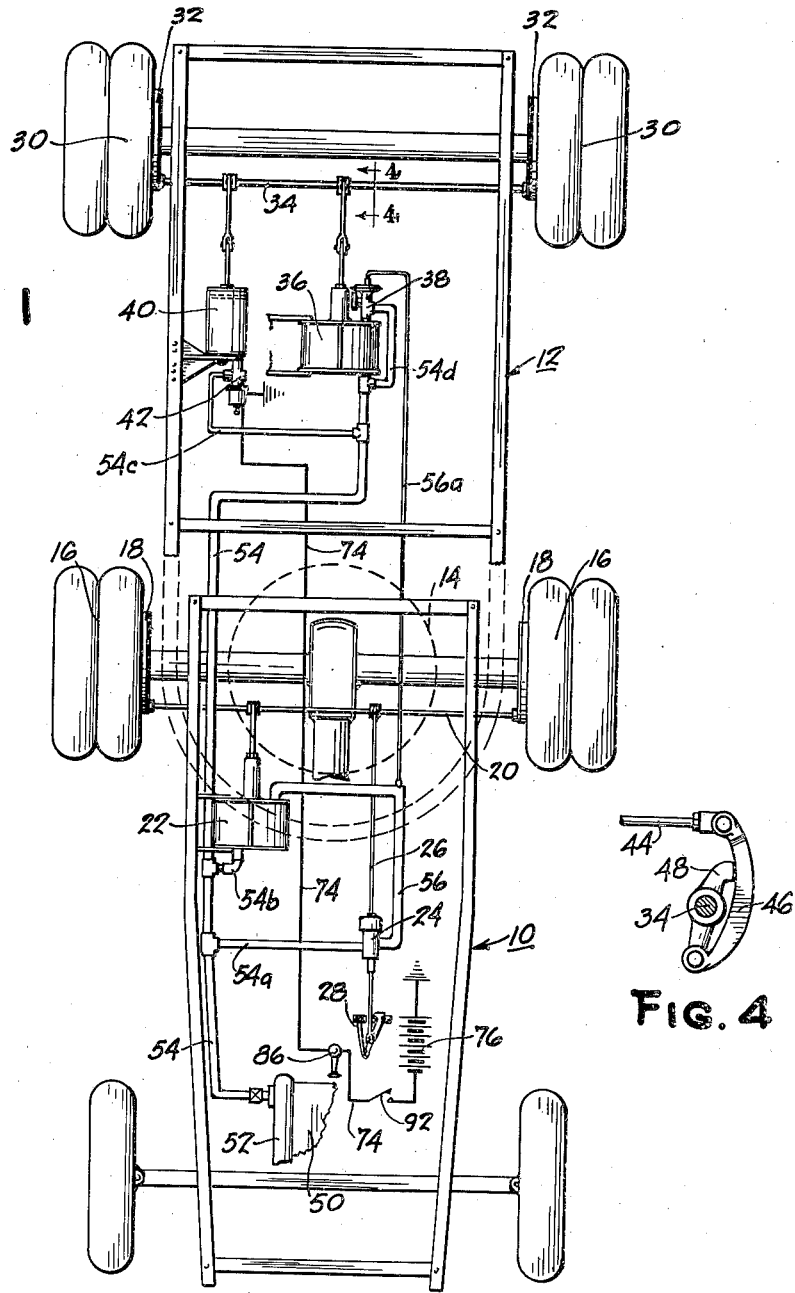
Figure 1 is a diagrammatic plan view of a tractor and semi-trailer provided with my novel braking means.
Figure 2:
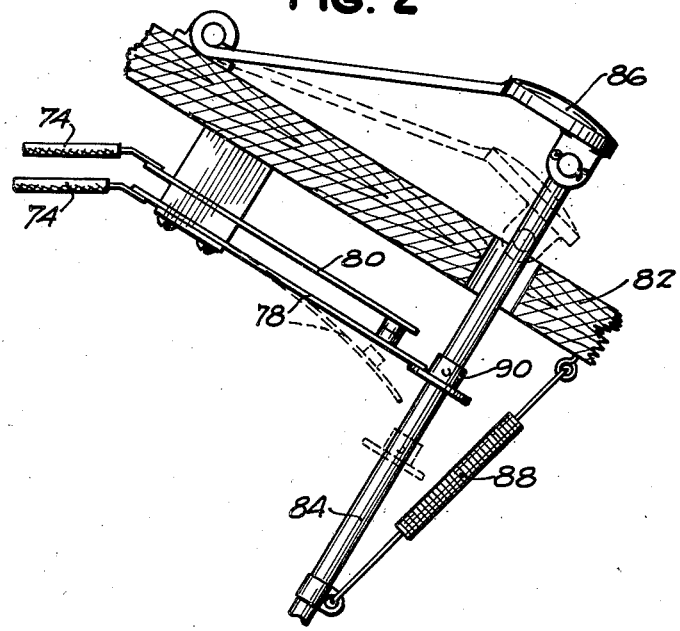
Figure 2 is a view on a larger scale of the accelerator pedal of the tractor of Figure 1 showing a control switch operated thereby.

Referring now to Figures 1–4 there is shown a tractor 10 coupled to a semi-trailer 12 by means of the usual fifth wheel 14. The tractor is provided with wheels 16 having brakes 18 operated by a cross-shaft 20. The cross-shaft 20 may be operated by a vacuum-suspended power cylinder 22 controlled by a valve 24 connected in a well-known manner into a brake rod 26 extending from a foot pedal 28 to the cross-shaft 20.

The trailer is provided with wheels 30 having brakes 32 operated by a cross-shaft 34. The cross-shaft 34 may be operated by a main power cylinder 36, the one illustrated being of the vacuum suspended type controlled by the usual relay valve 38, and by an auxiliary power cylinder 40 of smaller size, here illustrated as being of the air suspended type. The auxiliary cylinder 40 is controlled by a solenoid operated valve 42 shown in detail in Figure 3 and more fully described below.

I prefer to connect the cylinders 36 and 40 to the cross-shaft 34 by means of lost motion connections shown in Figure 4, in which a connecting rod 44 extending from the cylinder 40 is connected to one end of a floating lever 46. The lever 46 has its other end connected to one end of a cross-arm 48 secured to the cross-shaft 34 and the said lever 46 abuts intermediate its ends against the oppositely extending end of the cross-arm 48. These lost motion connections permit either cylinder to operate independently of the other.

The tractor 10 has a motor 50 with the usual intake manifold 52 providing a source of vacuum. A vacuum line 54 extends from the manifold toward the rear of the vehicles and is connected by a branch 54a to the control valve 24, by a branch 54b to the forward end of the tractor power cylinder 22, by a branch 54c to the solenoid operated valve 42, by a branch 54d to the relay valve 38, and the said vacuum line 54 terminates in the forward end of the cylinder 36. As shown, the relay valve 38 and the solenoid valve 42 directly communicate with the rear and front ends respectively of their respective cylinders 36 and 40.

The control valve 24 has a controlled pressure line 56 extending from it to the rear of the tractor power cylinder 22 and a branch 56a of this controlled pressure line extends toward the rear and connects to the relay valve 38.

Figure 3:
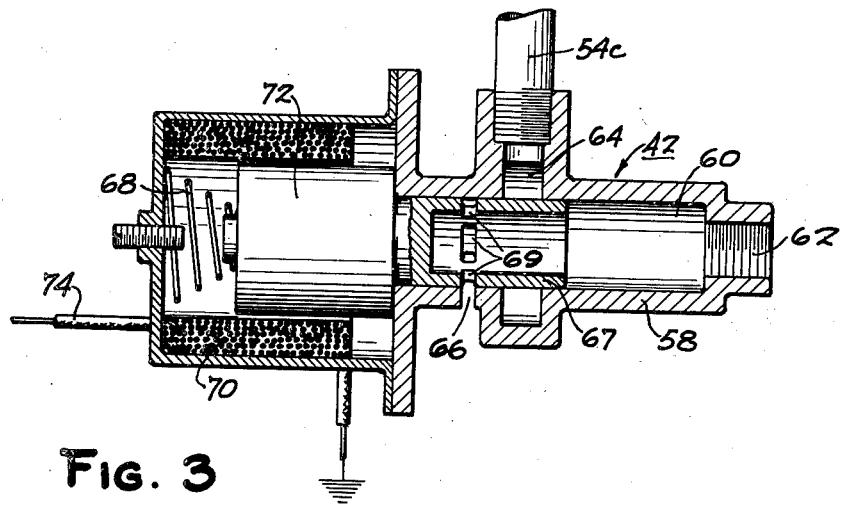
Figure 3 is a central longitudinal section through the solenoid-operated, fluid pressure control valve of Figure 1.

Referring particularly to Figure 3, the solenoid operated valve 42 comprises a casing 58 having a longitudinal cylindrical bore 60 provided with a port 62 in its forward end communicating with the auxiliary power cylinder 40 and with transverse ports 64 and 66, one of which, the port 64, communicates with the vacuum line extension 54c and the other of which, the port 66, communicates directly with the atmosphere.

Within the bore 60 is slidably mounted a hollow plunger 67 which, when moved to its extreme right-hand position by a spring 68, cuts off the vacuum port 64 and admits atmospheric pressure through the atmospheric port 66 and a series of ports 69 formed in the wall of the plunger. When the plunger is moved to its extreme left-hand position by means of a solenoid coil 70 acting on an enlarged end 72 of the plunger, it cuts off the atmospheric port 66 and opens the vacuum port 64.

One of the electric leads from the solenoid coil 70 is grounded and the other is connected to a wire 74 extending forwardly to the tractor when it is connected to one pole of the usual storage battery 76, the other pole of which is grounded.

Connected into the wire 74 is a switch comprising two normally open spring contacts 78 and 80 (see dotted lines in Figure 2) secured by insulators to the under side of the usual footboard 82 of the tractor and adjacent the usual accelerator rod 84. The accelerator rod 84 is operated by the usual accelerator pedal 86 and returned to throttle closed position by a tension spring 88. The free end of the lower spring contact 78 is extended beyond the upper contact 80 so as to be engaged by an insulating collar 90 adjustably positioned on the accelerator rod. The collar 90 is adjusted so that the contacts 78 and 80 are brought together when the accelerator pedal is fully released as shown in full lines in Figure 2.

I prefer, generally, to connect into the circuit of the wire 74, a switch 92 operated by the ignition key of the tractor so that said circuit is open when the vehicle is at rest and the motor stopped, thereby preventing discharging the battery 76.

The operation of the brakes of the tractor and the main power cylinder 36 of the trailer is conventional and will only be described briefly. In the released position of the pedal 28, the valve 24 transmits the vacuum from the line 54a to the controlled pressure line 56 and its branch 56a. The tractor power cylinder 22 therefore has vacuum on both sides of its piston and exerts no brake applying force. The relay 38 has vacuum applied to it and consequently relays the same pressure from line 54d to the rear of the main trailer power cylinder 36 so that it also has vacuum on both sides of its piston and exerts no force on the trailer brakes.

When the pedal 28 is depressed, the valve 24 is operated to cut off the vacuum and admit air to the controlled pressure line 56 and branch 56a. The air pressure in the rear of the tractor power cylinder 22 thereupon acts to apply the tractor brakes and at the same time the relay valve 38 relays air pressure to the rear of the main trailer power cylinder 36 to apply the trailer brakes 32.

The operation of the auxiliary power cylinder 40 is as follows: Assuming that the tractor-trailer combination is traveling at an even pace along a highway, the accelerator pedal 86 will be depressed so that the contacts 78 and 80 are open. Consequently the solenoid coil 70 is not energized and the plunger 67 of the valve 42 is at its extreme right-hand position (Figure 3). With the plunger 67 in this position, air is admitted to the port end of the auxiliary cylinder 40 so that it exerts no force to apply the trailer brakes. At the same time the brake pedal 28 is released whereby the brakes at the tractor and the main power cylinder of the trailer are also in released position.

Now when the accelerator pedal 86 is fully released for any purpose; e. g., in anticipation of applying the brakes, or merely to let the compression of the motor 50 slow the vehicle somewhat, the contacts 78 and 80 are closed energizing the solenoid coil 70 of the valve 42 and drawing the plunger 67 to the extreme left position (Figure 3) to admit vacuum to the front end of the cylinder 40, whereupon the cylinder 40 exerts a predetermined force upon the crossshaft 34 to apply the trailer brakes 32. This force is not sufficient to fully apply the trailer brakes and cause rapid deceleration, but is only sufficient to prevent the trailer 12 from overrunning the tractor 10 and jack-knifing.

By my novel system, the subsequent operation of the main vehicle brakes by means of the pedal 28 is anticipated and the tendency of the trailer to overrun and "jack-knife" is overcome.

Figure 5:
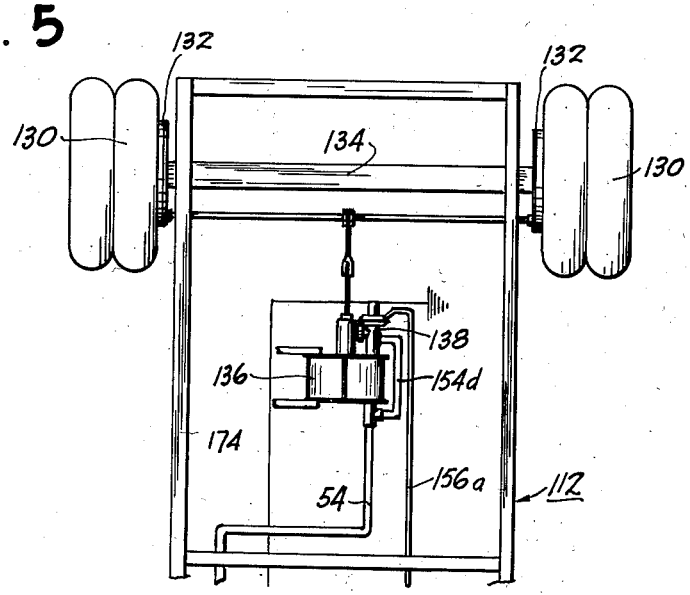
Figure 5 is a diagrammatic partial plan view of a trailer with a modified braking means.
Figure 6:
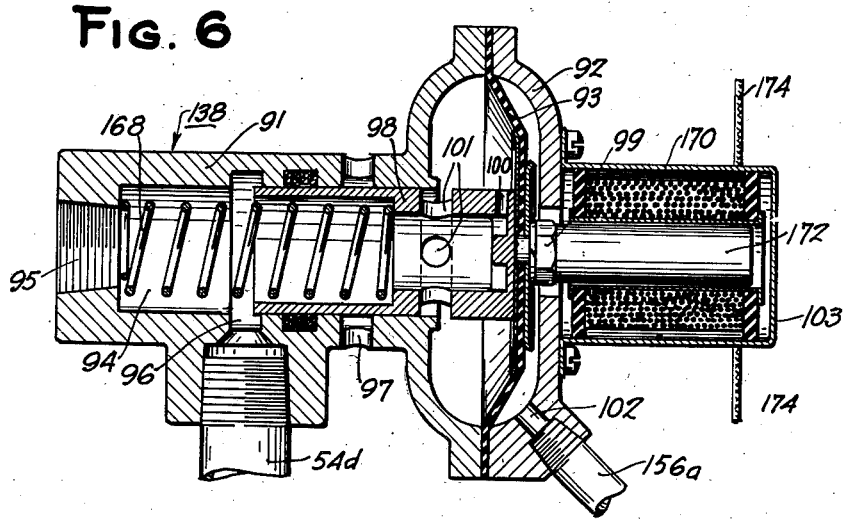
Figure 6 is a central longitudinal section through the combination fluid pressure, electrically operated relay valve of Figure 5.

In the modified system of Figures 5 and 6 (in which corresponding parts have the same reference numerals plus 100) I do not employ an auxiliary power cylinder but merely an auxiliary means of operating the main power cylinder. In this regard, I employ a novel relay valve 138 for the trailer power cylinder 136 which is partially controlled by a solenoid coil 170 operating a solenoid core 172.

This valve may comprise casing members 91 and 92 clamping between them a diaphragm 93. The casing member 91 may be formed with a longitudinal bore 94 having an end port 95 and transverse ports 96 and 97. The end port communicates with the rear of the power cylinder 136 in the usual manner, the port 96 communicates with the vacuum line 54d, and the port 97 communicates with the atmosphere. A hollow plunger 98 is slidably mounted in the bore 94 and secured to the diaphragm by a bolt 99. Passage 100 in the plunger 98 transmits the pressure in the bore 94 to the left side of the diaphragm. Passages 101 in the plunger are provided to align with the port 97 to admit air to the bore 94 when the plunger is in its extreme left-hand position and the port 96 is so positioned that it is uncovered by the end of the plunger 98 when the plunger is in its extreme right-hand position. The casing 92 is formed with a port 102 connected to the controlled pressure line 156a whereby the controlled pressure is transmitted to the right-hand side of the diaphragm 93. The solenoid coil 170 is secured in an air-tight casing 103 on the casing member 92 and the plunger 172 is arranged to press against the bolt 99 to force the plunger 98 to the left when the solenoid is energized.

The operation of this system in normal braking is as follows: When the brakes are released the pressure in the controlled pressure line 156a is full of vacuum. This draws the diaphragm to the right, uncovering port 96 and admitting vacuum to the bore 94 and therefore to the rear end of the cylinder 136 until the vacuum in the bore and cylinder equals that on the other side of the diaphragm, whereupon the plunger moves to the left cutting off the port 96. Now when the brakes are applied, air is admitted to the controlled pressure line 156a which acts on the diaphragm 93 to move the plunger to the left. This aligns passages 101 with the ports 97 admitting air to the bore 94 and the cylinder 136 to apply the brakes.

However, prior to the operation of the brakes in the normal manner the accelerator is released as previously described causing current to flow in the wire 174 and energizing the solenoid coil 170. The coil 170 thereupon forces the core 172 to the left taking with it the plunger 98 and causing air to be admitted to the cylinder 136 to apply the brakes. However, when the air pressure on the diaphragm 93 equals the force of the solenoid the plunger 98 returns to lapped position. It is my intention that the solenoid 170 should be so constructed that it exerts only sufficient force to apply the brakes enough to overcome the tendency to "jack-knife".

While I have shown and described two embodiments of my invention, it is not my intention to be limited by those embodiments or otherwise than by the terms of the appended claims.

I claim:

1. In combination, a tractor having a motor and brakes, a trailer having brakes, an accelerator control for the tractor motor, and means operable to apply the trailer brakes when the accelerator control is released.

2. In combination, a tractor having a motor and brakes, a trailer having brakes, means for applying the brakes of the tractor and trailer, an accelerator control for the tractor motor, and means operable to apply the trailer brakes when the accelerator control is released.

3. In combination, a tractor having a motor and brakes, a trailer having brakes, an accelerator control for the tractor motor, and means operable to apply the trailer brakes when the accelerator control is released, said means comprising a fluid power cylinder for applying said trailer brakes, a fluid control valve, and means for operating said valve controlled by said accelerator control.

4. In combination, a tractor having a motor and brakes, a trailer having brakes, an accelerator control for the tractor motor, and means operable to apply the trailer brakes when the accelerator control is released, said means comprising a fluid power cylinder for applying said trailer brakes, an electrically operated fluid control valve for actuating said power cylinder, and a switch operated by said accelerator control for actuating said valve.

5. In combination, a tractor having a motor and brakes, a trailer having brakes, means for applying the brakes of the tractor and trailer, an accelerator control for the tractor motor, and means operable to apply the trailer brakes when the accelerator control is released, said last named means comprising a fluid power cylinder for applying said trailer brakes, a fluid control valve, and means for operating said valve controlled by said accelerator control.

6. In combination, a tractor having a motor and brakes, a trailer having brakes, means for applying the brakes of the tractor and trailer, an accelerator control for the tractor motor, and means operable to apply the trailer brakes when the accelerator control is released, said last named means comprising a fluid power cylinder for applying said trailer brakes, an electrically operated fluid control valve for actuating said power cylinder, and a switch operated by said accelerator control for actuating said valve.

7. In combination, a tractor having a motor and brakes, a trailer having brakes, an accelerator control for the tractor motor, and means operable to apply the trailer brakes when the accelerator control is released, said means comprising electrically controlled power means for applying said trailer brakes, and a switch for controlling said power means operated by said accelerator control.

8. In combination, a tractor having a motor and brakes, a trailer having brakes, means for applying the brakes of the tractor and trailer, an accelerator control for the tractor motor, and means operable to apply the trailer brakes when the accelerator control is released, said last named means comprising electrically controlled power means for applying said trailer brakes, and a switch for controlling said power means operated by said accelerator control.

9. In combination, a tractor having a motor and brakes, a trailer having brakes, power means for applying the tractor brakes, power means for applying the trailer brakes, means for substantially simultaneously operating both said power means, an accelerator control for the tractor motor, auxiliary power means for applying said trailer brakes, and means for operating said auxiliary power means by releasing said accelerator control.

10. In combination, a tractor having a motor and brakes, a trailer having brakes, power means for applying the tractor brakes, power means for applying the trailer brakes, means for substantially simultaneously operating both said power means, an accelerator control for the tractor motor, auxiliary power means for applying said trailer brakes, and means for operating said auxiliary power means by releasing said accelerator control, said last named means comprising a fluid control valve and means for operating said valve controlled by said accelerator control.

11. In combination, a tractor having a motor and brakes, a trailer having brakes, power means for applying the tractor brakes, power means for applying the trailer brakes, means for substantially simultaneously operating both said power means, an accelerator control for the tractor motor, auxiliary power means for applying said trailer brakes, and means for operating said auxiliary power means by releasing said accelerator control, said last named means comprising an electrically operated fluid control valve and a switch operated by said accelerator control for actuating said valve.

12. In combination, a tractor having a motor and brakes, a trailer having brakes, power means for applying the tractor brakes, power means for applying the trailer brakes, means for substantially simultaneously operating both said power means, an accelerator control for the tractor motor, auxiliary power means for applying said trailer brakes, and means for operating said auxiliary power means by releasing said accelerator control, said last named means comprising a switch operated by said accelerator control and a control circuit for said means including said switch.

13. In combination, a tractor having a motor and brakes, a trailer having brakes, power means for applying the tractor brakes, power means for applying the trailer brakes, means for substantially simultaneously operating both said power means, an accelerator control for the tractor motor, auxiliary power means for applying said trailer brakes, and means for operating said auxiliary power means by releasing said accelerator control, said last named means comprising a normally open switch closed by said accelerator control when said control is released and a control circuit for said means including said switch.

14. In combination, a tractor having a motor and brakes, a trailer having brakes, a power cylinder for operating the trailer brakes, means for controlling said power cylinder substantially in unison with the operation of the tractor brakes, an accelerator control for the tractor motor, and auxiliary means for controlling said power cylinder operable when the accelerator control is released.

15. In combination, a tractor having a motor and brakes, a trailer having brakes, a power cylinder for operating the trailer brakes, means for controlling said power cylinder, an accelerator control for the tractor motor, and auxiliary means for controlling said power cylinder operable when the accelerator control is released.

16. In combination, a tractor having a motor and brakes, an accelerator control for the tractor motor, a trailer having brakes, a power cylinder for operating the trailer brakes, a relay for controlling said power cylinder, and two means for controlling said relay, one of which is operable to apply said power cylinder when the accelerator control is released.

17. In combination, a tractor having a motor and brakes, an accelerator control for the tractor motor, a trailer having brakes, a power cylinder for operating the trailer brakes, a relay for controlling said power cylinder, and two means for controlling said relay, one of which is operable to apply said power cylinder when the accelerator control is released, said one means comprising a solenoid on said relay and a switch on said tractor closed when said accelerator control is released.

MATHIAS LEUPOLD.